United States Patent [19]

Coleman et al.

[11] Patent Number: 5,056,132

[45] Date of Patent: Oct. 8, 1991

[54] SWITCH DEVICE ADAPTED TO INTERFACE BETWEEN AN INCOMING TELEPHONE LINE AND AN INTERNAL TELEPHONE SYSTEM

[75] Inventors: Edward R. Coleman, Natick; Danny C. Vogel, Randolph; David A. Vogel, Westwood; Diane P. Cherry, Foxboro, all of Mass.

[73] Assignee: Intertech Engineering Associates, Inc., Dedham, Mass.

[21] Appl. No.: 384,772

[22] Filed: Jul. 25, 1989

[51] Int. Cl.[5] .......................................... H04M 11/00
[52] U.S. Cl. ...................................... 379/95; 379/100
[58] Field of Search ................. 379/95, 100, 200, 113, 379/114

[56] References Cited

U.S. PATENT DOCUMENTS

| | | | |
|---|---|---|---|
| 4,585,904 | 4/1986 | Mincone et al. | 379/200 |
| 4,642,425 | 2/1987 | Guinn, Jr. et al. | 379/57 |
| 4,757,267 | 7/1988 | Riskin | 379/113 |
| 4,788,714 | 11/1988 | Hashimoto | 379/102 |
| 4,788,718 | 11/1988 | McNabb et al. | 379/113 |
| 4,850,008 | 7/1989 | Berg et al. | 379/100 |
| 4,860,347 | 8/1989 | Costello | 379/88 |

Primary Examiner—Jin F. Ng
Assistant Examiner—Ahmad F. Matar
Attorney, Agent, or Firm—Grimes & Battersby

[57] ABSTRACT

A switch device adapted to interface an incoming telephone line and an internal telephone system comprising a telephone, a facsimile machine, and an auxiliary device such as a modem, answering machine, or another telephone. The switch device automatically receives and answers incoming communications and asks for an identifying code from the caller which will characterize the incoming communication. After characterizing the incoming call, the switch device then alerts the telephone user or the facsimlile machine or the auxiliary device that there is an incoming communication. The non-alerted units are blocked out. A programming mode is provided to prioritize or selectively channel calls that are unidentifiable by the switch device to a preselected default device so that no incoming calls will be lost.

13 Claims, 15 Drawing Sheets

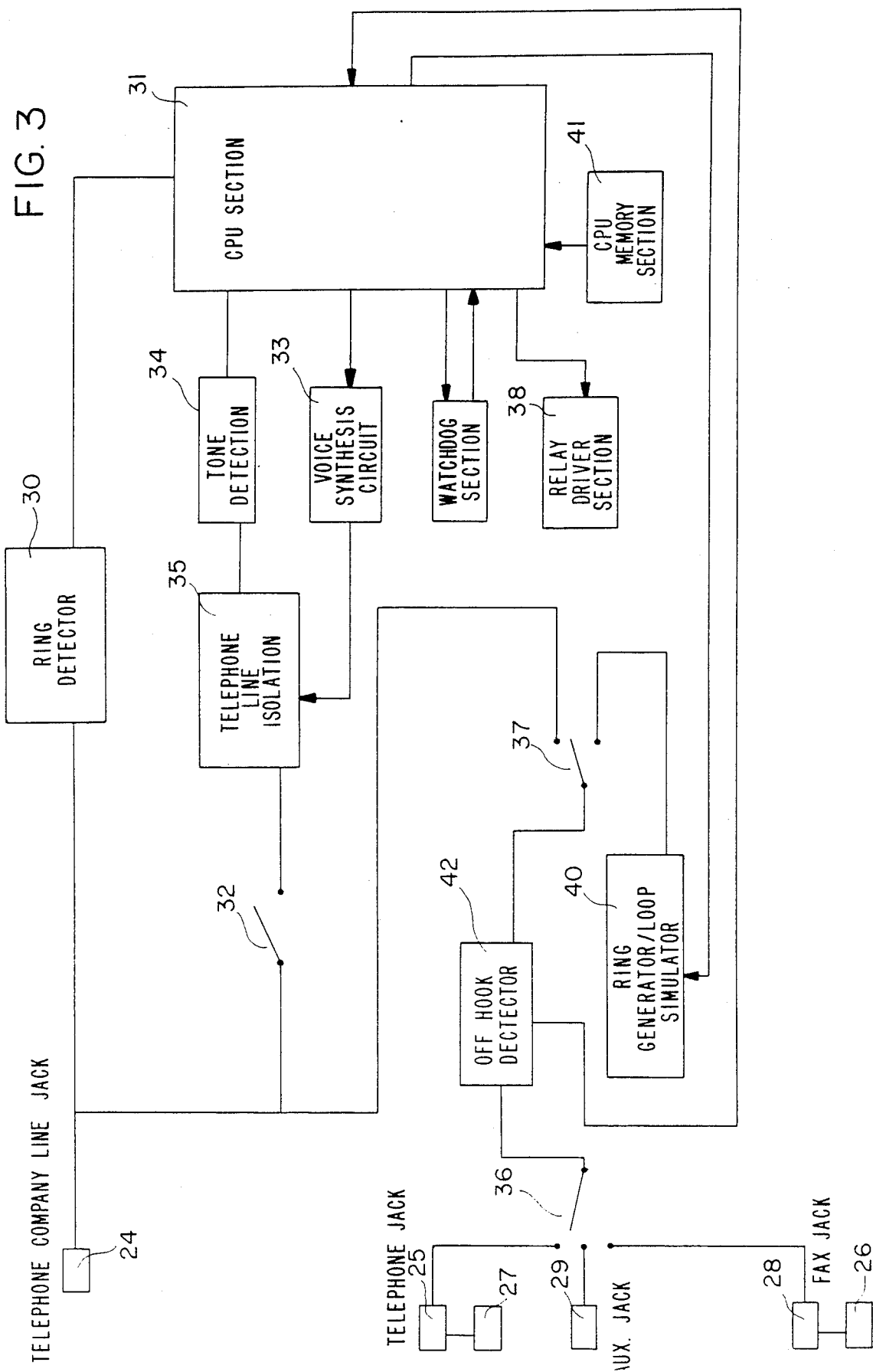

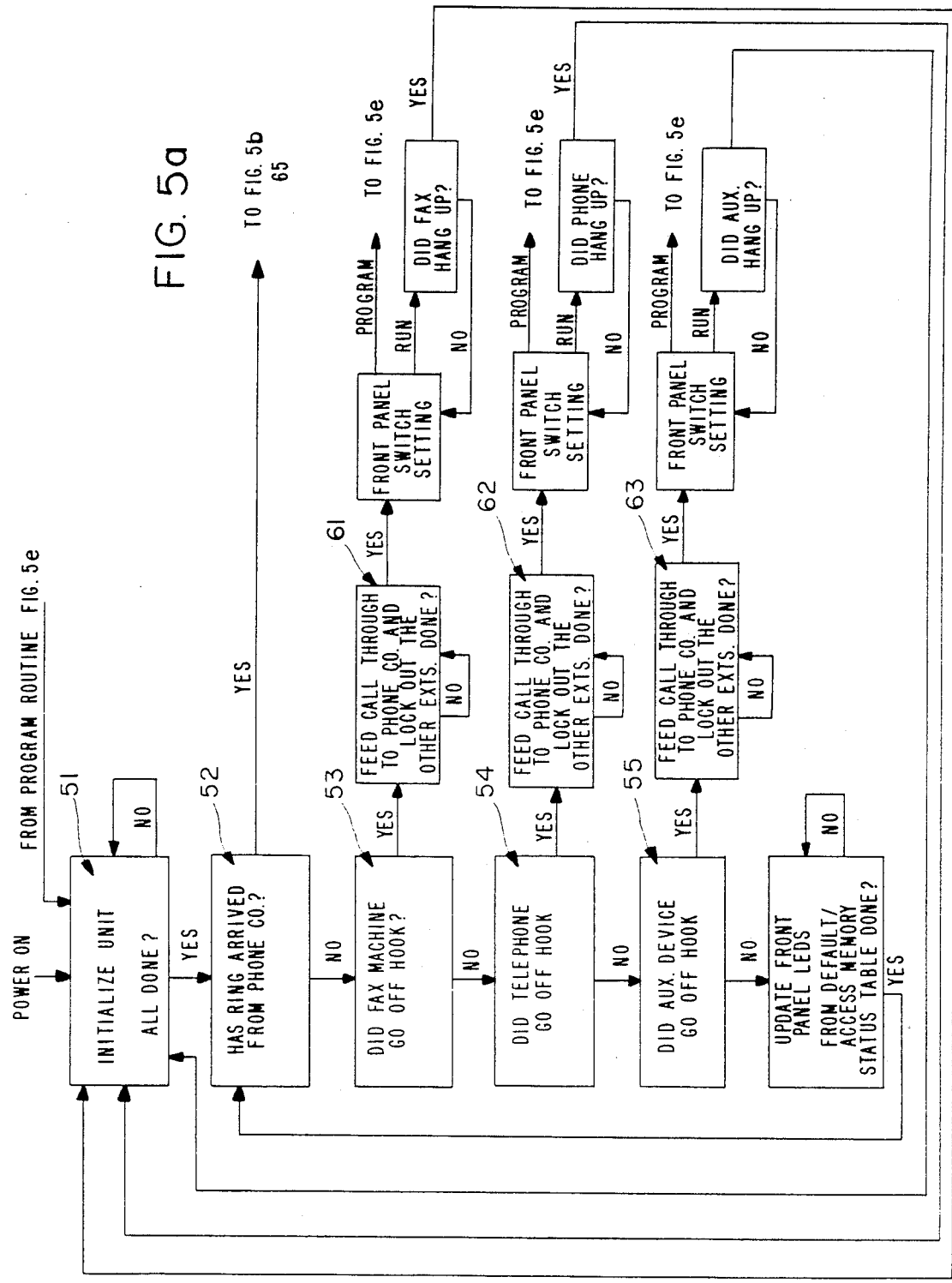

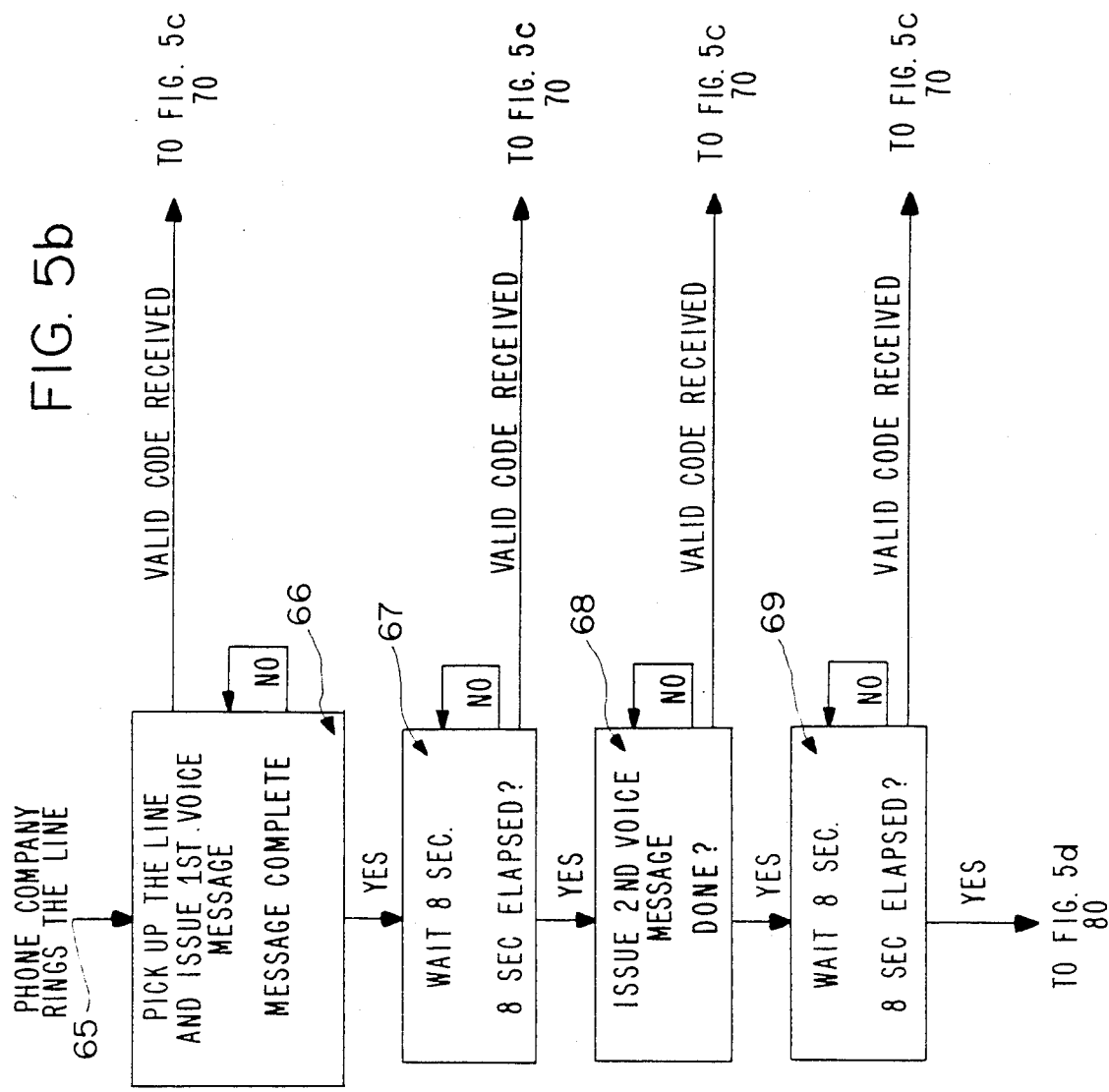

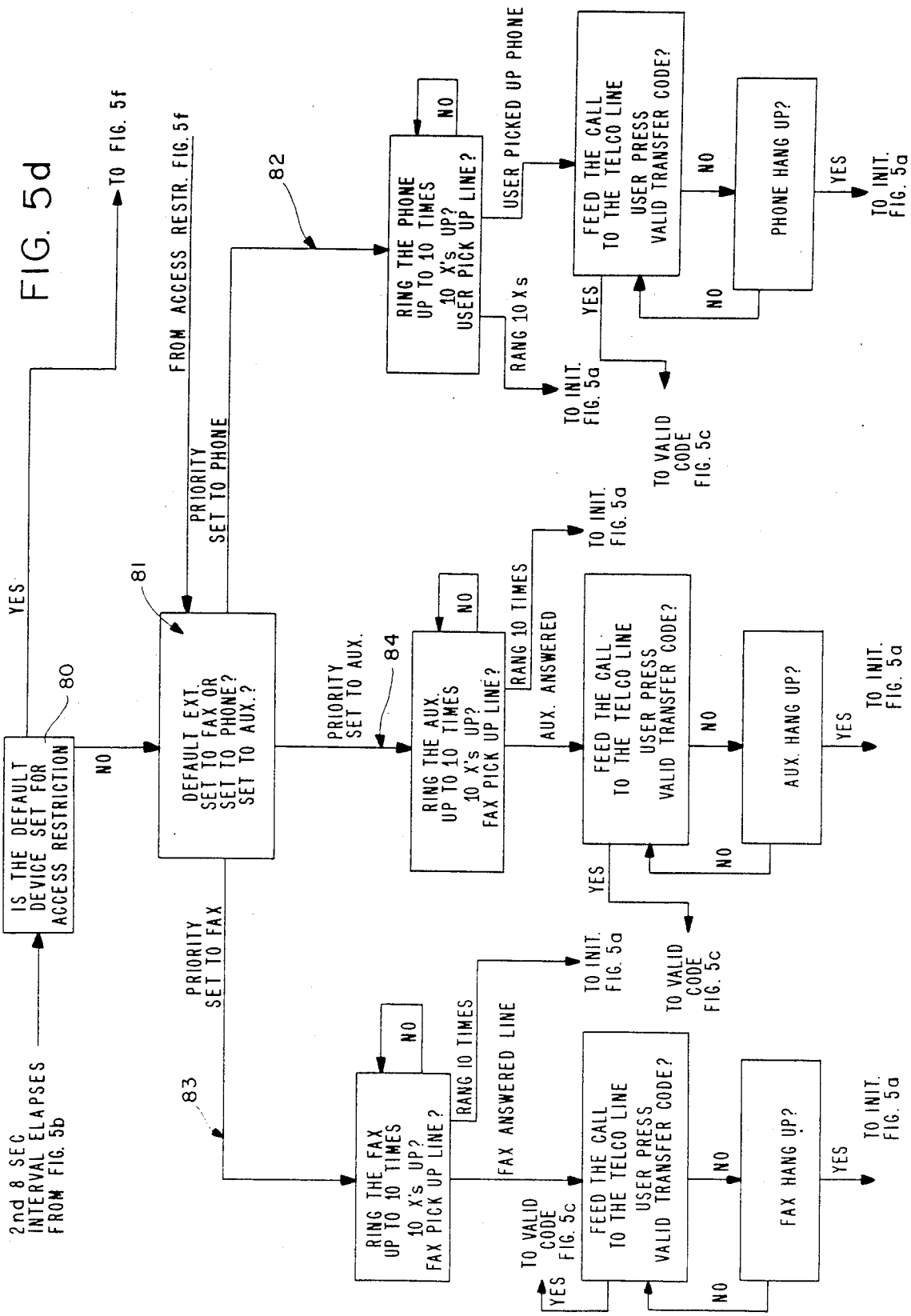

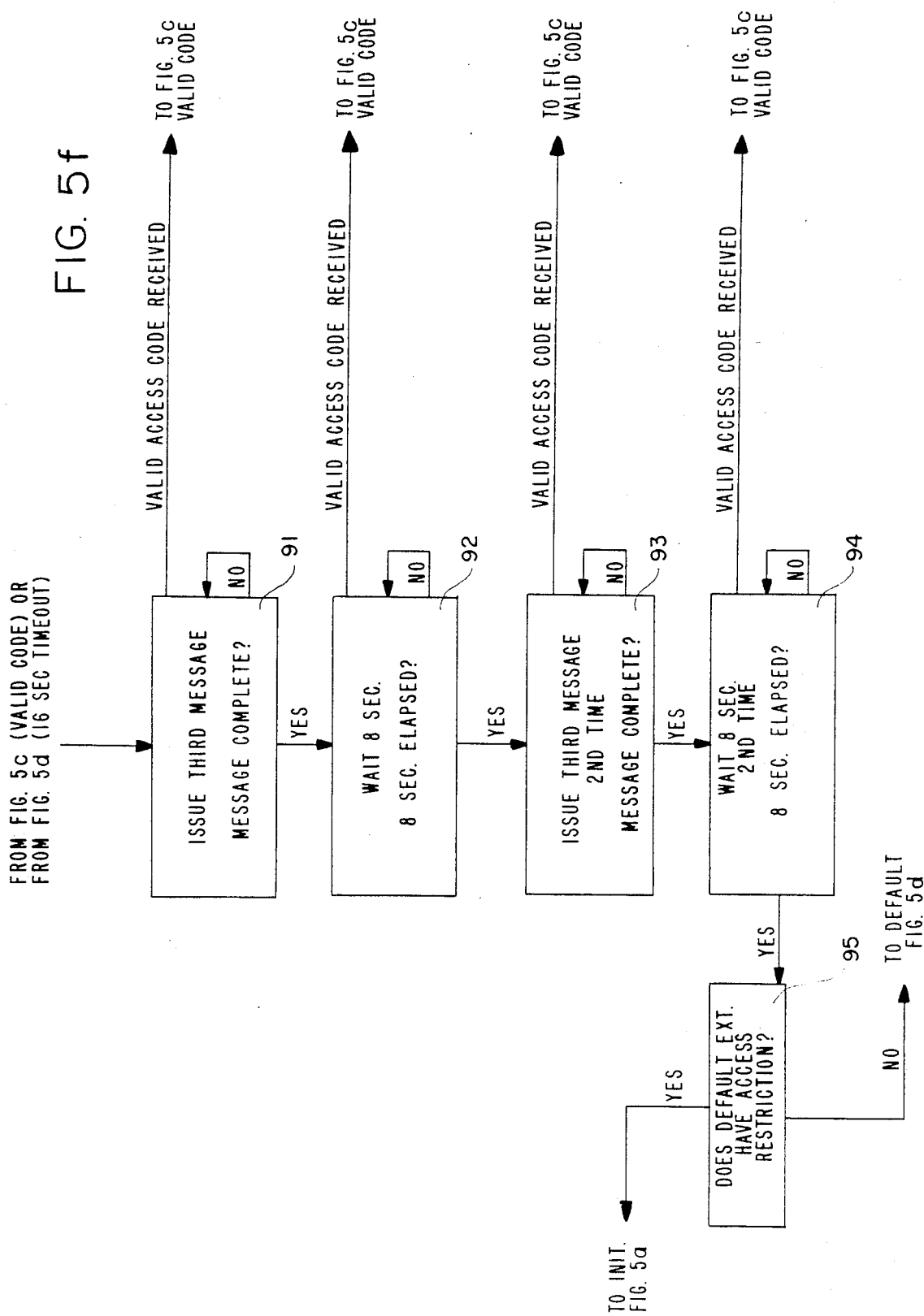

SWITCH DEVICE ADAPTED TO INTERFACE BETWEEN AN INCOMING TELEPHONE LINE AND AN INTERNAL TELEPHONE SYSTEM

BACKGROUND OF THE INVENTION

1. Field of the Invention

The present invention relates to communication device which receives an incoming communication, communicates with the caller, receives data as to the type of the incoming communication, and automatically channels the communication according to the data received. More particularly, the present invention relates to a communication switch device which interfaces with an incoming telephone line, internal telephones, and is adapted to interface with an internal facsimile or "fax" machine and an auxiliary device, such as a modulator/demodulator device (hereinafter referred to as a "modem"), at the site. Further, the switch device receives the incoming telephone call, identifies the type of call, and automatically channels the call. The invention also monitors the status of the internal equipment, and provides means for restricting access to the various equipment which interface with switch device.

2. Description of the Prior Art

Equipment in telephone systems which interface with an incoming telephone line and internal equipment to receive an incoming call, identify the call and/or caller and channel the incoming call on a selective basis is known. This interface equipment is sometimes referred to as a switchboard and has required a telephone or a telephone switchboard operator. A telephone switchboard is usually used where the telephone system includes a plurality of telephones and numerous telephone lines. It is very seldom that a telephone switchboard is used in conjunction with an internal telephone system that has two or three telephones and as few as one incoming telephone line. The initial cost of a switchboard, and the cost of its operation, make the use of a telephone switchboard impractical.

Since the development of a facsimile machine which is connected to a standard incoming telephone line, a single telephone line office having a fax machine is commonly found. Due to the increase in unsolicited facsimiles ("junk faxs") which one receives, there is provided a feature which requires a secret code in order to gain access to the facsimile or telephone line. Obviously, this feature eliminates "junk faxs" thereby maximizing the availability of the fax line to receive desired faxs.

In some offices, office personnel receive all incoming telephone calls on several telephone lines, whether voice or data communication, and manually direct incoming calls as required to either the facsimile machine or an individual. Technical advances in interface equipment provide telephonic signal switching apparatus which when interfaced between incoming telephone lines and internal telephones equipment automatically channel incoming calls on a priority basis during a particular, predetermined time period Apparatus such as that taught in U.S. Pat. No. 4,663,773 to Takahashi, which issued on May 5, 1987, provides for plugging an external telephone into a facsimile machine, for example, with delayed response on the part of the facsimile machine so that manual pickup of incoming calls can be made before response is made to an incoming signal or call by the facsimile machine When using such equipment, all incoming phone calls are audible, but office personnel have no indication as to whether the incoming call is a data communication (for a fax machine) or a voice communication (for some office person) Further, should the incoming call be a data communication and the called party pick up the telephone receiver, the incoming call will be lost.

U.S. Pat. No. 4,546,212 to Crowder, which issued on Oct. 8, 1985, provides interface equipment for an internal telephone system having a modem apparatus which system automatically channels incoming telephone calls on a selective frequency band basis. The equipment also provides for superimposing voice communication over data communication. This interface equipment limits the audio range of the internal telephone system.

U.S. Pat. No. 4,677,660 to Yoshida, which issued on June 30, 1987, is directed to an apparatus for a facsimile machine which answers an incoming call and generates an identifying signal, such as a tone, as in normal fax machine protocol. If no facsimile machine response signal is received by the facsimile machine, it assumes the incoming call is a voice communication and generates a break tone which alert office personnel. This built-in fax-telephone apparatus may then be used for voice communication. This apparatus limits the channeling of a voice communication to another telephone since the telephone on the facsimile machine must be used to answer the incoming call.

U.S. Pat. No. 4,773,080 to Nakajima et al., which issued on Sept. 20, 1988, is directed to an audio output or speaker on a facsimile machine that allows the called party to monitor the communication as it occurs. The called party and the calling party may use their respective built-in fax-telephones to communicate irrespective of the communication mode set at the called station. This apparatus does not channel incoming telephone calls according to the characteristics of the call, i.e. data communication or voice communication.

U.S. Pat. No. 4,660,218 to Hashimoto, which issued on Apr. 21, 1987, is directed to a circuit and a protocol which is built into a facsimile machine. A standard telephone is connected to the facsimile machine having the circuit of the Hashimoto patent. The telephone will ring when an incoming call is received. If the called party does not answer the line after a predetermined number of rings, the facsimile machine will receive the line and issue an outgoing tone to the caller. Simultaneously, the facsimile machine will sound an alert to the called party to pick up the telephone. If the facsimile machine receives a tone or response from the calling party, the facsimile machine will switch to the facsimile mode and lock out the telephone. If no response is received from the calling party, the facsimile machine will send out a voice message "Please wait".

U.S. Pat. No. 4,584,434 to Hashimoto, which issued on Apr. 22, 1986, teaches a telephonic switching apparatus which interfaces an incoming telephone line with a facsimile machine and a telephone answering machine. A telephone is connected into or in parallel with the answering machine. When a communication comes over the incoming telephone line, the answering machine and associated telephone ring in unison.

If the associated telephone is not picked up, the answering machine answers the incoming call. Upon instructions from the answering machine, a message may be left if the incoming call is a voice communication or a facsimile machine code signal may be sent if the incoming call is a data communication. If a facsimile machine code signal is received by the answering machine, an incoming call signal is then sent by the answering machine to the internal facsimile machine. When the facsimile machine answers the incoming communication, the answering machine and associated telephone are blocked out and a data communication takes place. The protocol of the answering machine limits the apparatus. Should the answering machine answer the incoming call before the receiver of the associated telephone is picked up to answer the call, the answer machine must be turned off or else the communication cannot be made over the associated telephone. This virtually requires that the user of the associated telephone be located close to the answering machine. Further, there is only a single channel for calls, that is, only the facsimile machine. Another disadvantage of this apparatus is that all incoming calls ring on the associated telephone regardless of whether the incoming call is a data communication or a voice communication. Essentially, there is no distinguishing of calls prior to the ringing of the internal telephone.

There is presently on the market a DATA-DOC facsimile director device which is made by Data Doc Electronic, Inc. of Austin, Tex. This device greets an incoming caller with a synthesized voice message, and recognizes a Touch Tone Code to determine the requested telephone line. Further, this device will default to a fixed particular line, such as a facsimile, if no valid response is received. However, this device fails to provide a default selection switch which permits a user to select the line to default to when a valid response is not received. Further, this device provides a dead line in the no-power condition thereby failing to permit the normal operation of the telephone or facsimile when power is not supplied.

SUMMARY OF THE INVENTION

It is an object of the present invention to provide a telephone signal switch device adapted to be connected to an existing incoming telephone line.

It is another object of the present invention to provide such a telephone signal switch device in which the caller can determine whether the incoming call should be directed to a telephone, a facsimile machine, or another auxiliary device such as a modem, answering machine, etc.

It is still another object of the present invention to provide such a telephone signal switch device in which the call will not be lost should the caller fail to indicate where the incoming call should be directed.

It is yet another object of the present invention to provide such a telephone signal switch device which provides for receipt in an existing telephone line of voice and data communications, and also provides that a user can use the same telephone line to make a normal outgoing call.

It is yet another object of the present invention to provide such a telephone signal switch device in which a user will not be disturbed by facsimile machine signals and the like should the incoming communication be a data communication.

It is yet still another object of the present invention to provide such a telephone signal switch device in which a program switch is provided which permits a user to select the line to default to when a valid response is not received.

It is yet still another object of the present invention to provide for screening out unwanted voice and data calls by means of an access restriction device.

It is yet still another object of the present invention to provide means for assigning access codes to each internal phone line so that a caller must use the proper code in order to gain access to the inside line. It is yet a further object of the present invention to provide a ring generator circuit to produce a signal to the selected outgoing line.

These and other objections of the present invention are achieved by the telephone signal switch device interface, an external or incoming telephone line and an internal telephone system which includes a telephone, a facsimile machine, and/or other auxiliary apparatus. When interfaced between the incoming telephone line and the internal telephone system, the switch device permits shared use of one telephone line by a standard telephone, a facsimile machine, and an auxiliary device such as a modem, answering machine or another telephone.

Also, when the present telephone switch device is interfaced into an internal telephone system having a telephone, a facsimile machine and an auxiliary device, the telephonic system is continually monitored.

Further, when either the telephone device, the facsimile machine, or the auxiliary device is in use, the lines to the other devices are disabled so that there is no interference. Specifically, when the telephone is in use during a telephone call or voice communication, the lines to the facsimile machine and the auxiliary device are disabled. Likewise, when the facsimile machine is in use during a data communication, the lines to the telephone and to the auxiliary device are disabled, and when the auxiliary device is in use, the lines to the facsimile machine and to the telephone are disabled.

In its interface position, the switch device receives all incoming calls. In response to an incoming telephone ring or call, the programmed central processing unit (CPU) effectively answers the incoming call by first connecting to the telephone line so as to open up the voice communication system. The caller will hear a synthesized first, voice message such as, for example, ..."You have reached a shared facsimile/voice access system, please press or dial 1 for voice or 2 for facsimile, or 3 for of other data. The caller then has a selected predetermined time, for example 8 seconds, to press a button or dial a number on his telephone. If the caller fails to respond to the synthesized voice message by typing the correct or valid code or by providing a special CNG tone, then the incoming call will be channeled to either the telephone, the facsimile machine, or the auxiliary device in the internal telephone system depending on a predetermined priority access basis. If there is no access restriction and then should the caller presses button #1 on his telephone key pad, the switch device will channel the incoming call to the telephone in the internal telephone system and blockout the facsimile machine and the auxiliary device. The internal telephone will ring signaling an incoming voice call.

Should the caller press another button, such as the button #2, on his telephone key pad, the automated switch device will channel the incoming call to the facsimile machine and block-out the internal telephone and the auxiliary device. Likewise, should the caller press button #3, the switch device will channel the incoming call to the auxiliary device and block-out the internal telephone and the facsimile machine. If there is access restriction on a given line, the caller will be further prompted to provide an additional predetermined code (programmed by the user) to route the call to the desired extension.

It will be noted that full telephonic interception is achieved by the switch device. In the event the caller cooperates with the synthesized message, switchboard type functioning is automatically achieved. In the event the caller fails to cooperate with the synthesized voice message, the incoming call is channeled or switched on a predetermined priority/access basis to the telephone, the facsimile machine, or the auxiliary device. The predetermined priority is readily set by the user. Unwanted calls can be screened out by the switch device, while expected incoming calls are not lost for lack of cooperation by the caller.

When the computerized automated switch device is in its monitoring or stand by status and the internal lines are not in use, an outgoing telephone call may be made in the normal manner. Specifically, the user simply picks up the internal telephone, waits for the telephone dial tone, and proceeds in the normal fashion to dial a telephone number.

When the internal telephone is in use, the facsimile machine and the auxiliary device are blanked out. Likewise, when the facsimile machine is in use, the internal telephone and the auxiliary line are blanked out. Also, when the auxiliary device is in use, the facsimile machine and the internal telephone line are blanked out, and the lines will appear dead to one that attempts to use the internal telephone. It should be noted that this "privacy" feature eliminates the potential for party line calling. The present device will accept a touch tone code from the telephone to select the switch settings in such a way as to permit party line parallel connection on the internal lines Many state of the art facsimile machines include an autodialing function which is designed to redial a telephone number if there is no answer from the dialed number. A no answer status may occur should the dialed number be in use or the dialed number be unattended. The present switch device permits an autodial facsimile machine to recycle and redial an unanswered number until the line that has been called is free or answers. Thus, the facsimile machine may be initiated into its dialing operation and then left unattended The facsimile machine will proceed to make telephone contact and complete its data communication.

It will be appreciated after reading the above summary that the present invention both as a switch device and as a switch component used in a telephone system overcomes the shortcomings of the prior art devices and greatly advances the art where small telephone systems are concerned.

BRIEF DESCRIPTION OF THE DRAWINGS

FIG. 3 is a block diagram of the switch device;

FIGS. 5a, 5b, 5c, 5d, 5e and 5f are flow charts which show a protocol which can be used in the switch device of the present invention.

DETAILED DESCRIPTION OF THE PREFERRED EMBODIMENTS

Figure 1:
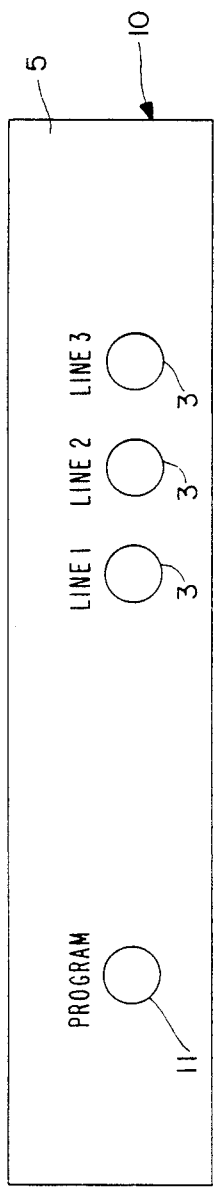
FIG. 1 is a pictorial representation of the front panel of the switch device of the present invention.

Referring to FIG. 1, there is provided a front panel, generally represented by reference numeral 5, of the switch device 10 of the present invention. The front panel or face 5 of the cabinet of the switch device 10 includes a momentary contact switch 11. The momentary switch 11 used to set the unit to one of two modes of operation (PROGRAM and RUN). In the programming mode the user may set the internal default/access settings as desired. In RUN mode, the unit is in normal operation and functions as the switch device. The user can program the unit such that when data fed into the switch device 10 is insufficient for the switch device to make a decision, the data will not be lost. The front panel 5 also includes three "line" indicators 3. The line indicators display the programmed status of the switch device 10 as programmed by the user during the programming mode.

Figure 2:
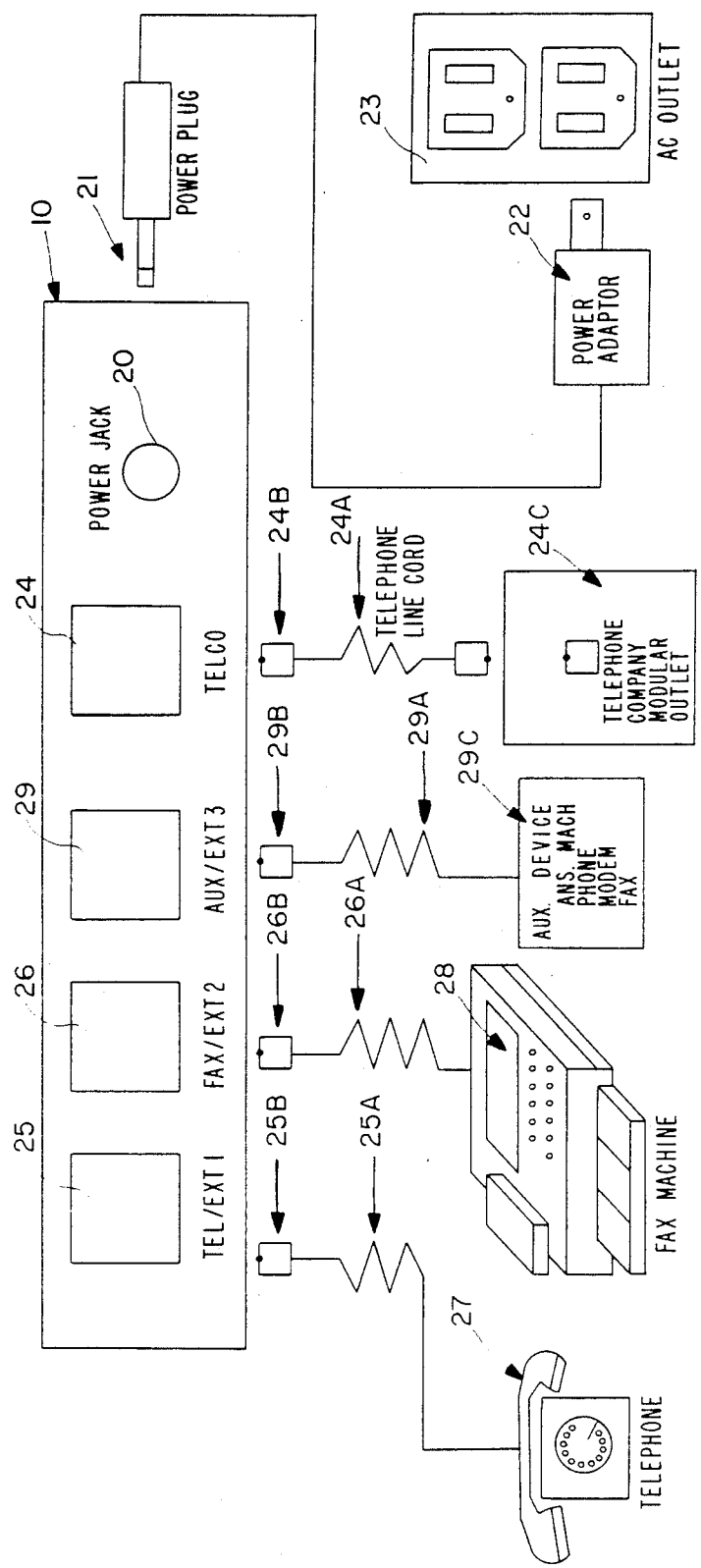
FIG. 2 is a pictorial representation of the rear panel of the switch device and the hook-up of internal telephone system to an outside telephone line.

The rear of the cabinet of the switch device 10, which is shown in FIG. 2, includes a power jack 20 which is adapted to accept a plug 21 through which is provided low voltage power. A power adapter or converter 22 plugs into a building receptical, such as an AC outlet 23, to receive normal electrical power. A power converter (not shown) converts the electrical utility company voltage to a lower voltage which is fed to drive the switch device 10. Power converters are well known and may be purchased to convert high voltage power into virtually any low voltage power.

The receptical 24 (TELCO) is adapted to receive a plug 24B of an external telephone line 24A which connects the internal telephone system to the telephone company system. A line 24A is provided to connect the switch device to a telephone company provided receptical 24C.

The receptical 25 (TEL/EXT1) is adapted to receive a plug 25B on the cord 25A connecting a standard telephone 27 to the switch device 10. The receptical 26 (FAX/EXT2) is adapted to receive a plug 26B on the cord 26A which connects a fax or facsimile machine 28 to the switch device 10. Another receptical 29 (AUX/EXT3) is adapted to receive a plug 29B on the cord 29A connecting an auxiliary device 29C to the switch device 10. When connected in this fashion, the switch device 10 is connected to the incoming telephone line for pressing communication between the outside or external telephone company system and the internal telephone 27, the facsimile machine 28, and the auxiliary device 29. Thus, the switch device 10 effectively interfaces between the incoming telephone line, the internal telephone, the facsimile machine and/or the auxiliary device.

FIG. 3 is a block diagram of the interaction of the components of the switch device 10. The switch device 10 includes a ring detector 30 which detects the ring of the telephone company indicating an incoming call. The ring detector, when a ring is detected, provides a signal to the central processing unit (CPU) 31 which initiates an incoming call answering procedure. The switch 32 is closed and the voice synthesis circuit 33, is activated to answer the incoming call.

In the preferred protocol, the voice synthesis circuit communicates with the caller by identifying the internal telephone system the caller has reached. The user may program this message during the programming mode. The caller is requested to identify this communication as a voice communication (by pressing a button, such as #1, on his phone), as a data communication (by pressing button #2), or communication to an auxiliary device (by pressing button #3). This code is detected by the tone detection block 34. The telephone line isolation block 35 passes communication both ways. The tone detector block 34 identifies the communication as a voice communication, data communication or auxiliary communication, and signals the CPU 31 accordingly. During this process, the switch 37 is set to isolate effectively the unidentified communications, such as the telephone 27, the facsimile machine 28, and the auxiliary device, from the external telephone line. The relay driver section 38 is provided to energize and deenergize relays for opening and/or closing the switches 32, 36 and 37 in proper sequence and in accordance with the control unit of the CPU.

When the incoming communication is identified as a voice, a data or a auxiliary communication, the incoming call is appropriately channeled to the telephone 27 by closing switch 37 in response to a signal from CPU unit and moving switch 36 in a closed position for a voice communication, to the facsimile machine 28 by moving switch 36 in a closed position for a data communication or to the auxiliary device by moving the switch 36 in a closed position for auxiliary communication. The ring generator/loop simulator block 40 rings the telephone 27 to alert the user of the telephone 27 that a call is coming through or rings the facsimile machine 28 so that a data communication can proceed or rings the auxiliary device 29 so that auxiliary communication can proceed When the device being run answers the call, switch 37 is set to route the external incoming line to the selected device.

As is normal in computers, the CPU 31 includes a memory section 41 which includes a ROM (read only memory). The ROM is programmed with instructions to operate the switch device. A RAM (random access memory) is available to allow processing the functions of the switch device.

FIGS. 4a, 4b, 4c and 4d combine to show the circuit diagram of the present computerized, automated, telephone switch device. The schematic circuit includes part values and connection data. Sections of the circuit diagram are related to the block diagram of FIG. 3. It is believed one skilled in the art will readily understand the circuit diagram and will be able to practice the invention using the information provided in the circuit diagram shown in FIGS. 4a, 4b, 4c and 4d.

Figures 1, 4A:
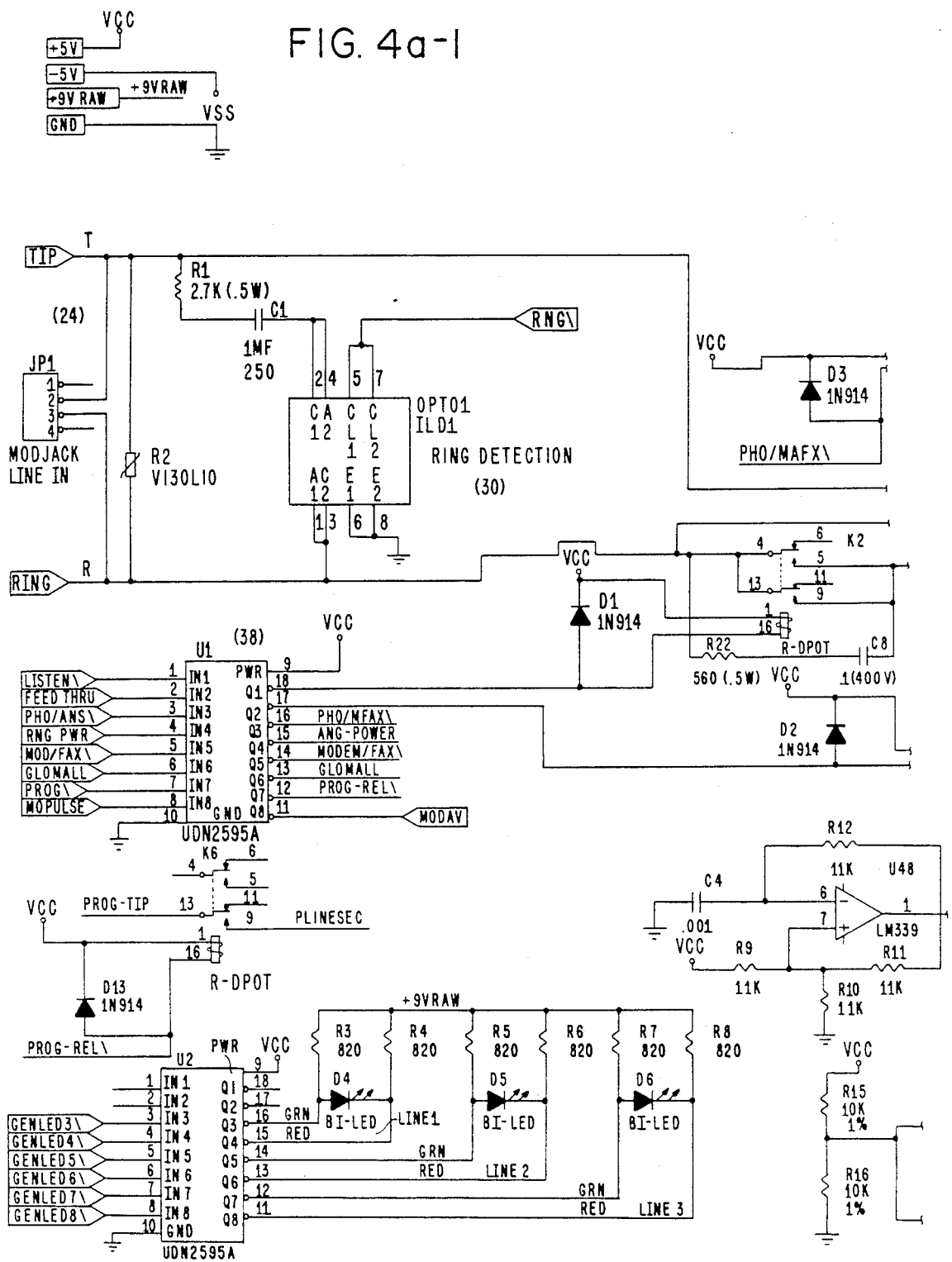
FIGS. 4a, 4b, 4c and 4d, are circuit diagrams which, when combined, disclose the circuit of the switch device.
Figures 2, 4A:
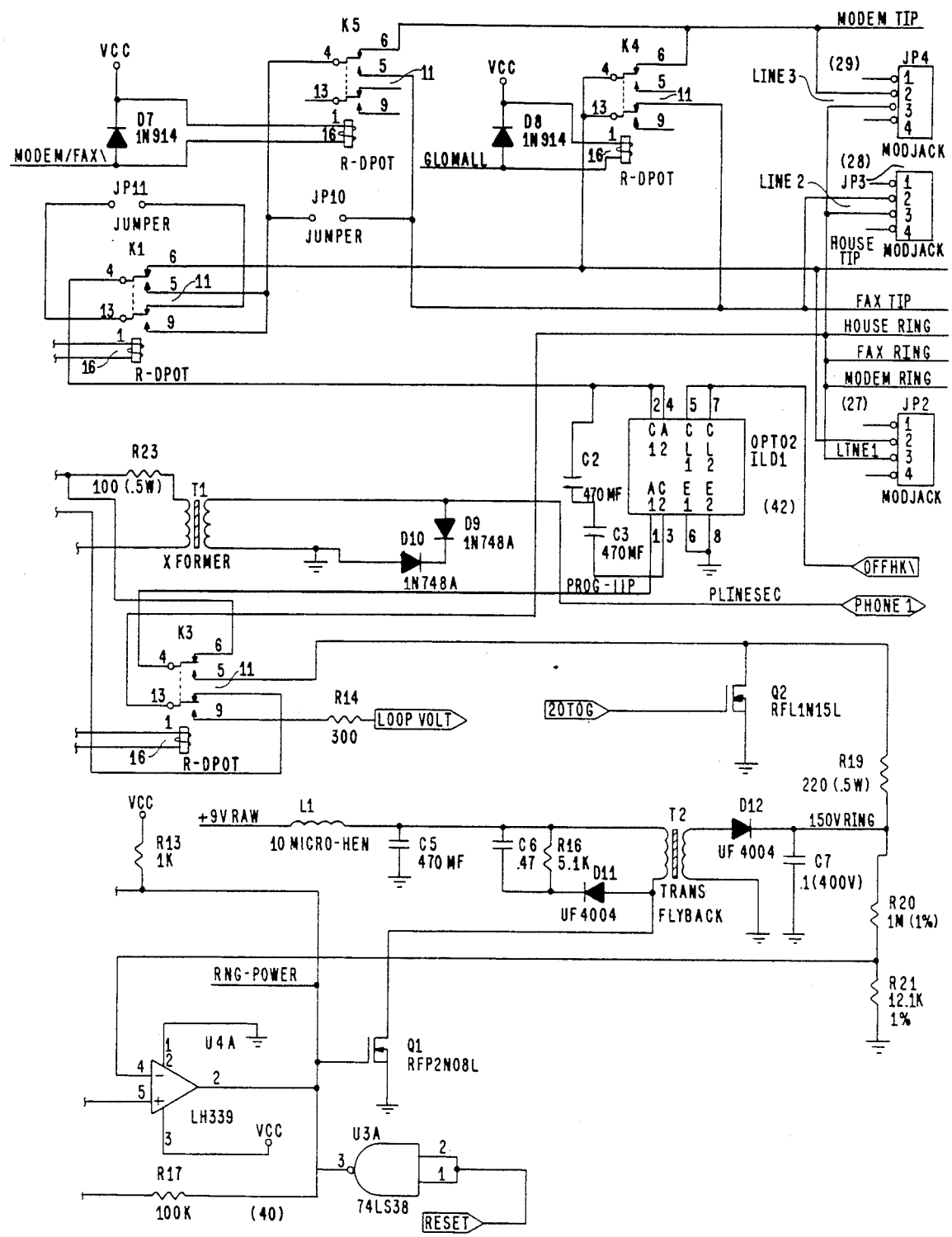
Figures 1, 4B:
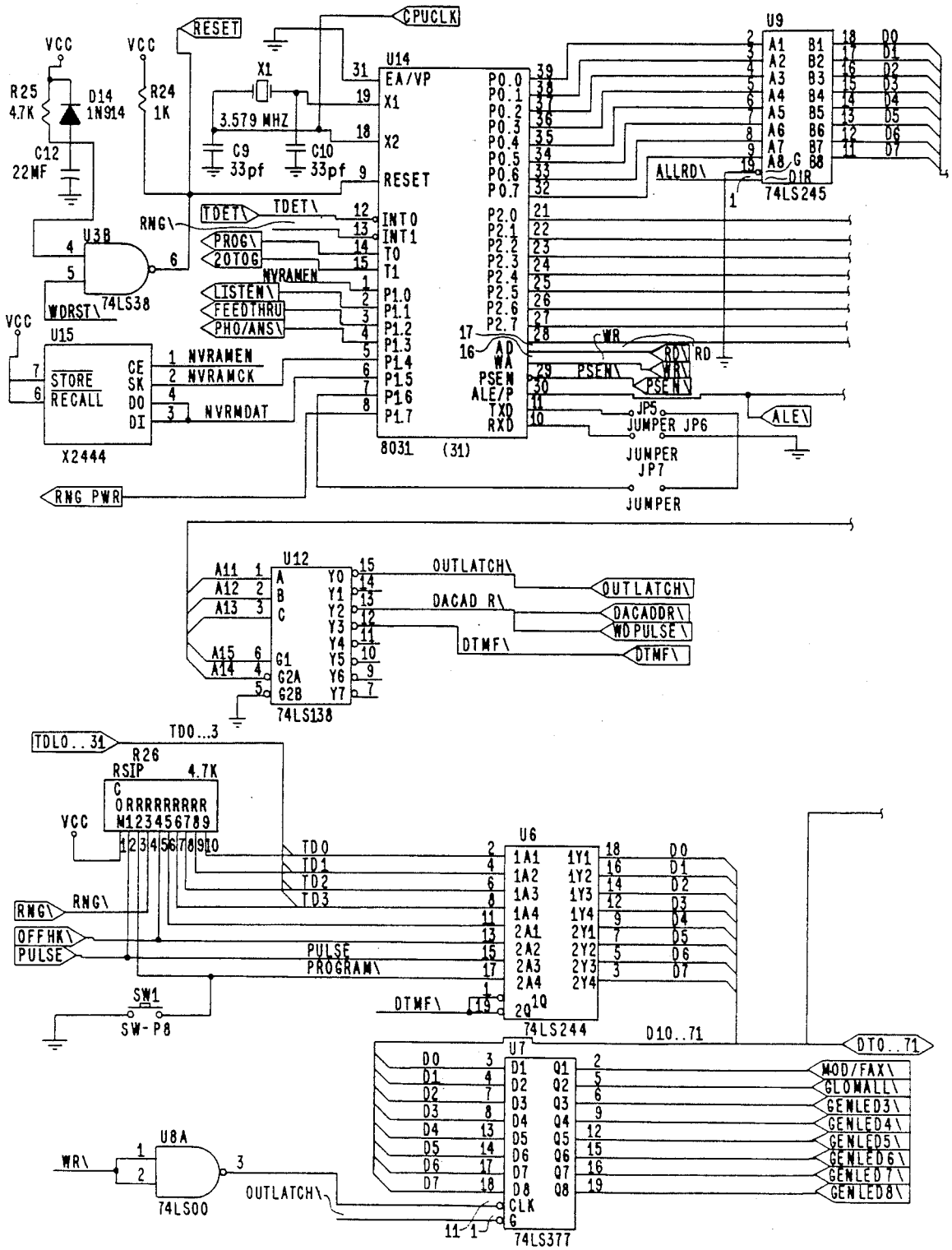
Figures 2, 4B:
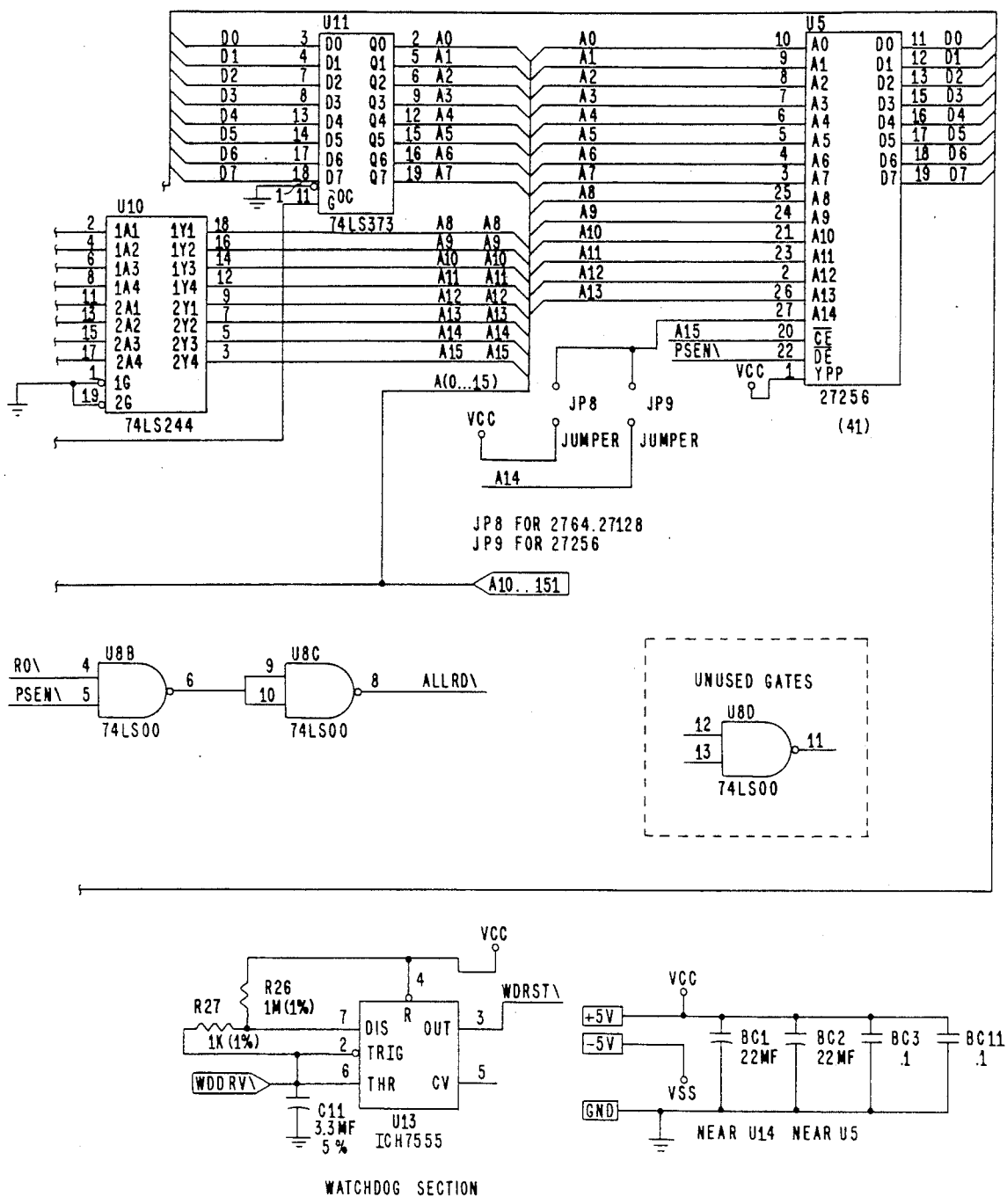
Figure 4C:
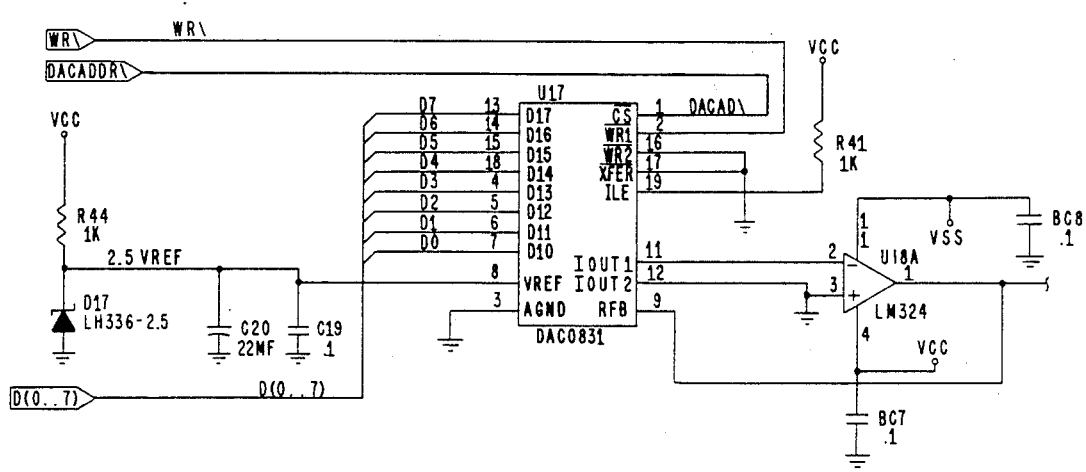
Figure 1:
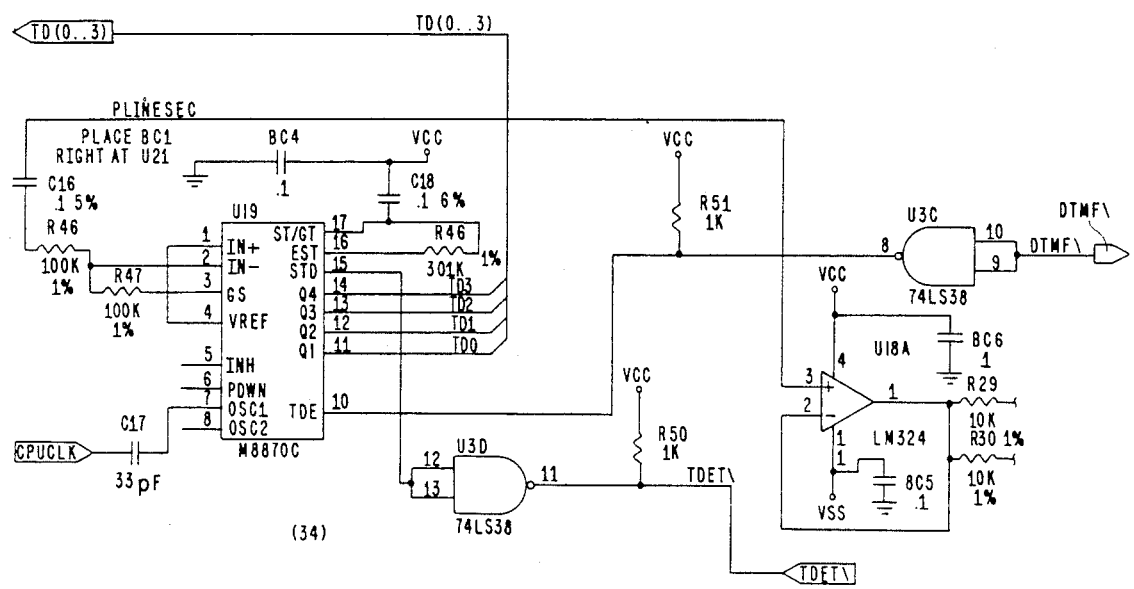
Figures 2, 4C:
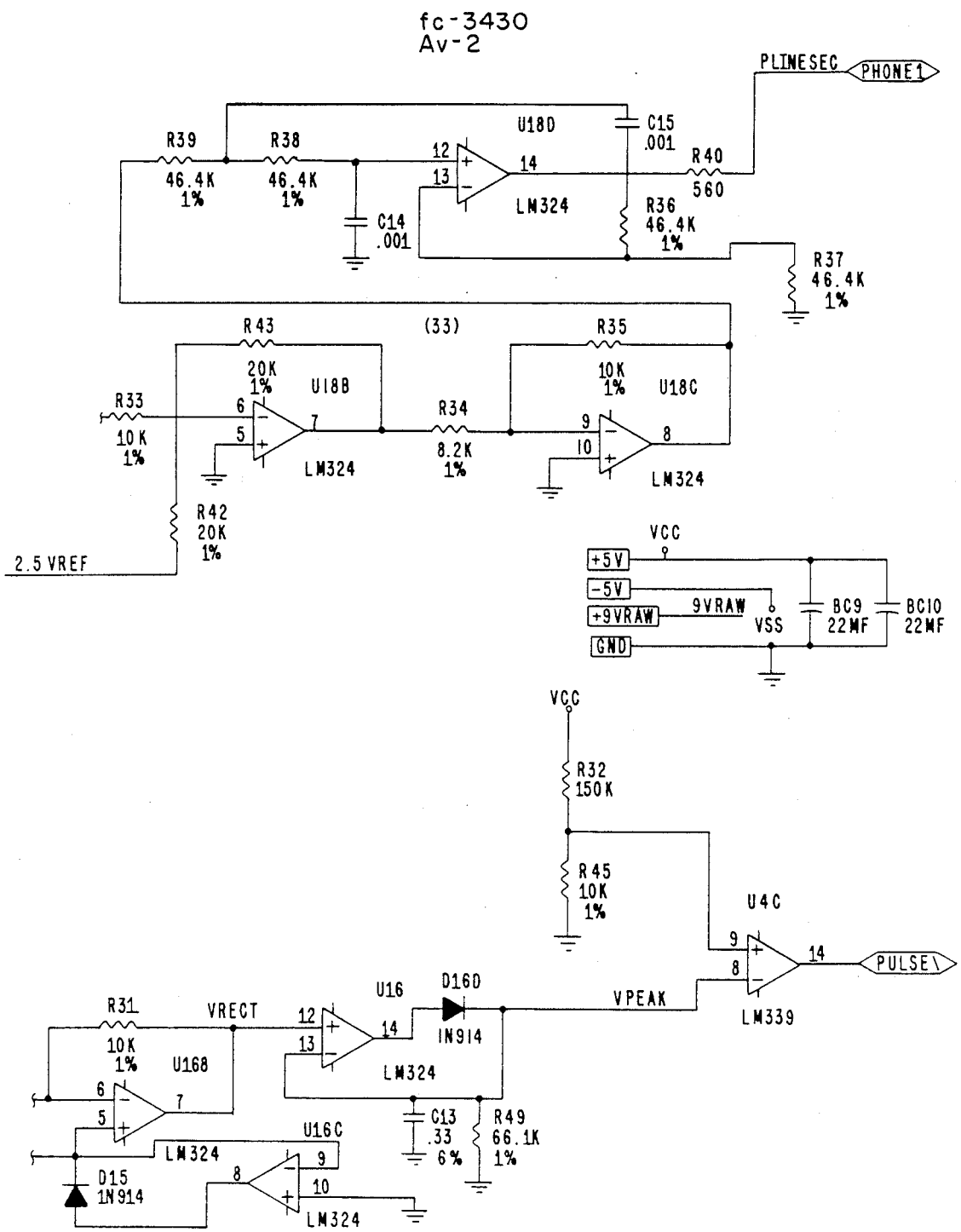
Figure 4D:
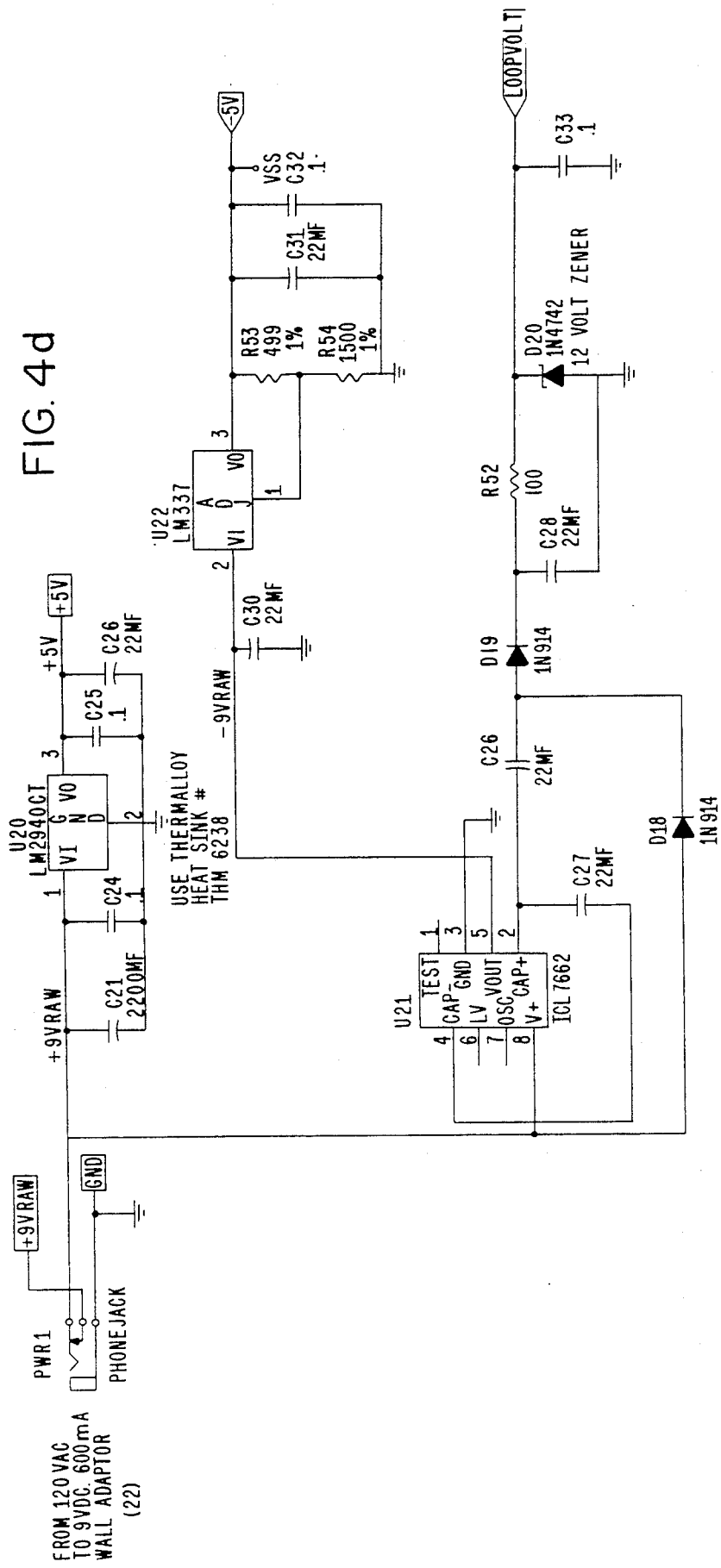

The ring generator 40 (shown in FIG. 3) includes a unique circuit shown in FIG. 4a which provides a low cost method of producing a ring signal to the selected outgoing line Typically, the telephone company provides a 20hz, 90vrms signal superimposed over a central office battery voltage of −48vdc. The ring parameters vary widely ranging from about 16hz to 60hz in frequency and from 40 to 138 vrms in amplitude. Prior art devices simulate ring signals somewhere within the ranges stated above. However these devices accomplish this task by using large, heavy and, therefore, quite costly transformers. The low cost circuit of the present invention, which is described below, generates enough power to ring a 5 REN (ringer equivalence number) load. This is equivalent to ringing 5 standard telephones known as 500 sets. The circuit takes advantage of the telephone companies wide range of ring signals, and is unique in that it uses inexpensive, readily available components to simulate this ring signal.

Specifically, the ring generator circuit shown in FIG. 4a consists of U4A, U4B, U3A, U14 (shown in FIG. 4b), U1, R9-R13, R15-R21, Q1, Q2, L1, C1, C4-C7, D11, D12, L1 and T2. U4B is set up as a relaxation oscillator with frequency output determined by R9-R12, C4 and VCC. This output is summed with U1.15, U4A, and U3A, and drives the gate of MOSFET Q1. A low level on any of these lines causes Q1 to shut down. In normal operation, the microprocessor U14 brings U1.15 high when the ring generator is producing the high voltage output half cycle. At this time U3A is also high. Therefore, the oscillator at U4B drives Q1's gate. The primary of the low cost flyback transformer T2 is driven on and off by Q1's drain producing a high voltage at the secondary. This voltage is rectified by D12. The output at D12 is monitored by the comparator U4A via R20 and R21. If the output goes below a threshold which is determined by R15, R16, the output of U4A lets the oscillator U4B drive Q1. If the output goes above this threshold, the U4A output goes low keeping the oscillator circuit from driving Q1's gate until the threshold is once again reached.

This configuration provides a minimum amount of voltage regulation. Since telephones will ring over a wide range of parameters, this low cost solution fits the application quite well. This high voltage half cycle lasts for 25ms and, at this time, Q2 is turned off by U14 delivering full power to selected outgoing line. It should be noted that U14 is dictated by the program code of U5 shown in FIG. 4b.

After the 25ms time period has elapsed, U14 brings U1.15 low to shut off the high voltage for 25ms, and Q2 is turned on to allow off hook detection. This cycle of ON-OFF is repeated for approximately a second, simulating the ringing signal sent by the telephone company.

In other words, power comes from a wall transformer and is shown as +9vraw in FIG. 4a. The power is converted to high voltage that is sufficient to ring the telephone. The T2 or flyback transformer is driven, via a transistor, by the oscillator. The CPU shuts the oscillator ON and Off in accordance with the programmed code in the CPU, i.e. U5 in FIG. 4b.

FIGS. 5a, 5b, 5d, 5e and 5f provide a series of flow charts which describe the operation of the switch device when the device is connected to an internal system including at least one telephone, a facsimile machine and an incoming line connected to the switch device. Although the flow charts provide a preferred sequence of operation, steps shown in sequence may be changed to some other cycle of operation Some steps in the preferred sequence of steps may be eliminated, while other steps not disclosed may be added, provided all such changes are within the principles of the operation of the present invention.

It is believed the flow charts set forth in FIGS. 5a, 5b, 5c, 5d, 5e, and 5f are self-explanatory and relate to the programmed memory of the CPU and the operation of the switch device. However, referring to FIGS. 5a, the power to the switch device is turned on by plugging the power adapter 22 into the building receptical 23 shown in FIG. 1. The switch device checks itself, at initialization step 51, to make certain the unit is initialized. The system is monitored, at step 52, to determine if a ring or call has arrived from the telephone company. If no call has arrived, steps 53 through 55 proceed to check the facsimile machine, the internal telephone line, and the auxiliary line for usage. If the facsimile machine, the telephone or the auxiliary device is off the hook, i.e.

activated for use, activation of that unit and block out or lock out of the unused or non-activated units is effected, such as indicated by blocks 61 through 63. Also if the user depresses the program mode-switch, while the telephone, facsimile or auxiliary device goes off, the unit proceeds as shown in the flow charts shown in FIG. 5e. If neither unit is activated for use, the switch device checks its internal programming (programmed by the user during the program mode) and sets itself accordingly.

Figure 5C:
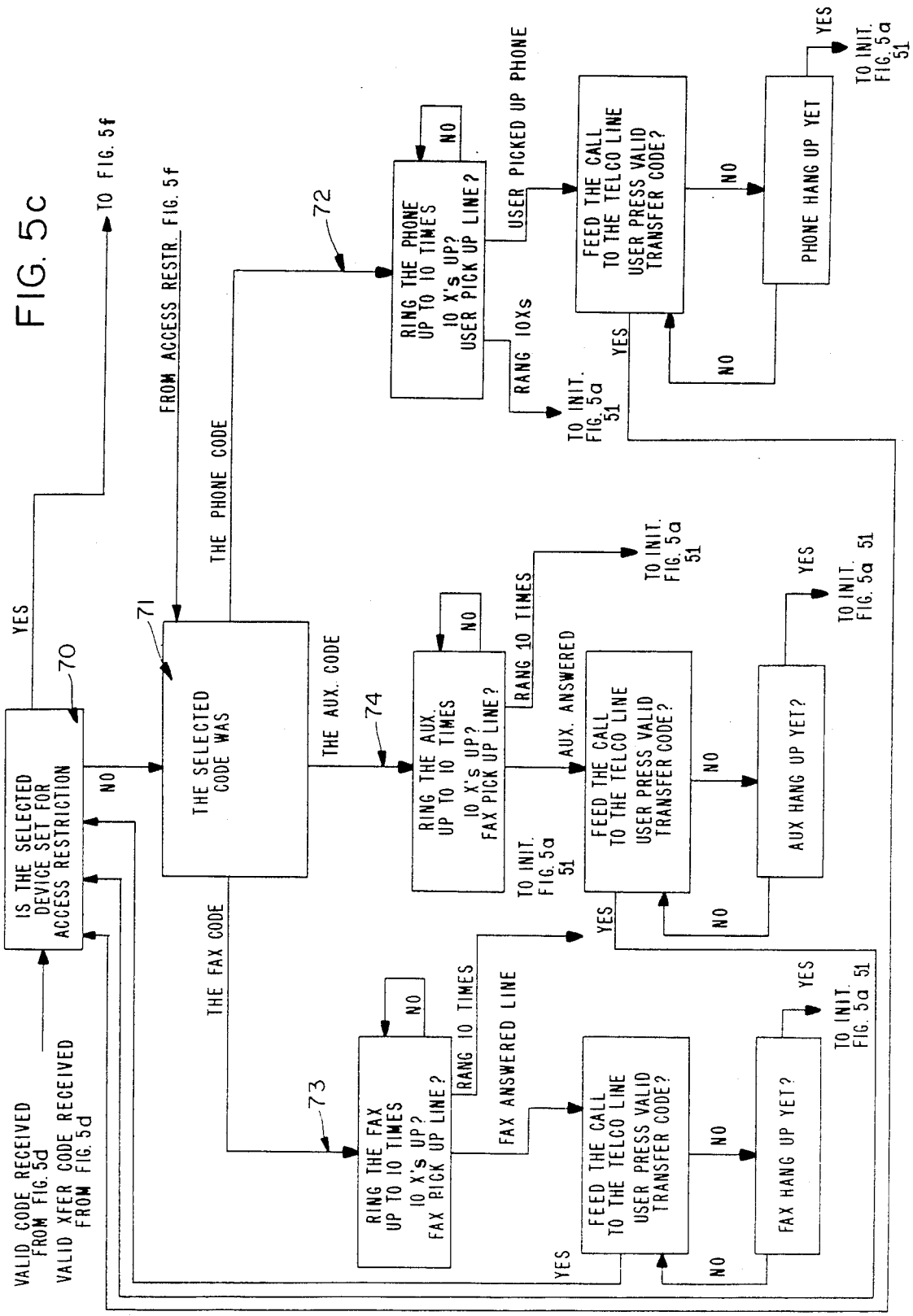
Figure 5E:
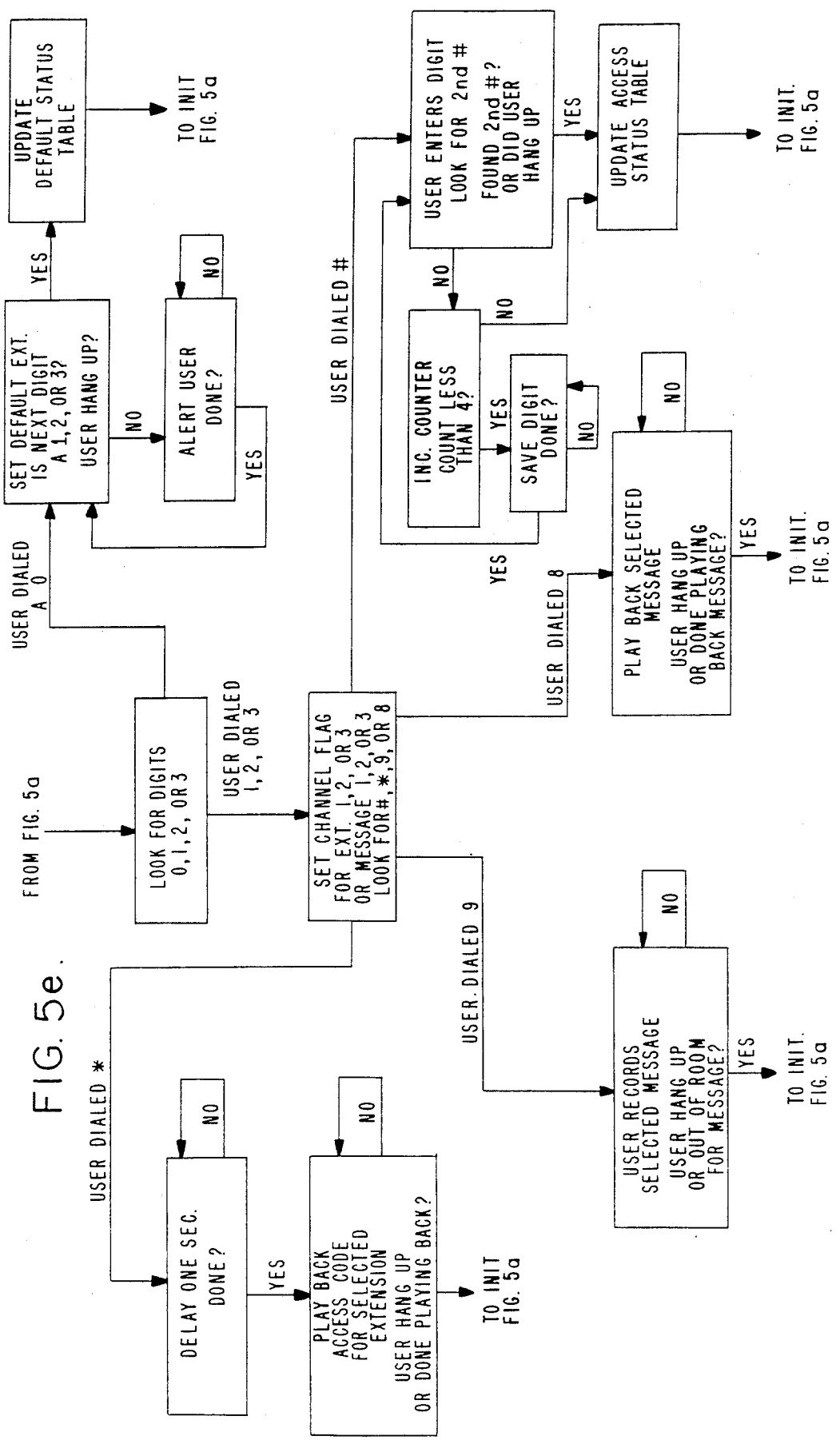

When an outside communication arrives as at step 52, the incoming line is connected to the switch device electrically and the incoming call is answered at step 66 shown in FIG. 5b. To ensure that the incoming call is answered, steps 67, 68 and 69 are carried out. If an answer from the caller is received, the cycle proceeds as indicated at 70 to a code distinguish or recognition step 71 shown in FIG. 5c. If the communication is a voice communication, procedure or step 72 follows. If the communication is to the auxiliary device procedure 74 follows.

Referring to step 69 of FIG. 5b, when a second 8 second time increment has elapsed without a valid code having been received, the cyclic operation advances to connect the telephone line on a priority basis as established by the internal programmed status of the switch device, as indicated by line 80 and block 81 shown in FIG. 5d. If the default line is also programmed for access restriction then the procedure in FIG. 5f is followed to insure proper screening when the caller does not initially reply to synthesized voice message.

It should be understood that steps 67 and 69 can be programmed so that any amount of time can elapse. The preferred amount of time is shown in FIG. 5b. Also, steps 68 and 69 can be eliminated without departing from the spirit of the present invention. Specifically, it is not necessary that second voice message, be provided. Thus, an alternative embodiment (not shown) provides only steps 67 and 68 with step 68 leading directly to block 80 should the caller respond positively within the eight seconds.

Further, the voice message could be repeated two or more times, although no more than one repeat, i.e. steps 68 and 69, is desired. Furthermore, should the caller respond to the first voice message immediately, the program path moves directly to step 70, as shown in FIG. 5b. There is no need for it to move to the step 67 or the time wait step.

The step 71 of FIG. 5c determines the character of the incoming communication, either voice for the telephone or data for the facsimile machine or the auxiliary device (modem, etc.), and channels the incoming call accordingly. In any case, the telephone, the facsimile machine, or the auxiliary device rings without the uncalled units being disturbed.

A further aspect of the present device includes an access restriction feature. Referring to FIGS. 5a–5c and 5f, a ring received from the telephone company, shown in block 52 in FIG. 5a, causes a first voice message to be disseminated as shown in block 66 of FIG. 5b. The first voice message asks what type of communication, such as voice or data, shall be communicated. Should the caller respond before the message is complete and, therefore, a valid code is received, the circuit is directed to step 70 in FIG. 5c. Should the caller not respond before the message is complete, the circuit is directed to block 67. As stated above, the time period in block 67 can be programmed to any predetermined amount, however the preferred time is shown in block 67. Should a valid code be received, the circuit is directed to step 70 shown in FIG. 5c. As shown in FIG. 5b, the program provides that the second voice message be issued from step 68 should the caller not provide a valid code. In an alternative embodiment (not shown) the path would be directed to block 80 shown in FIG. 5d. In either event, step 70 provides "Is the selected device set for access restriction". Should the answer be no, the path goes to block 71 shown in FIG. 5c. Should the answer be yes, the path moves to FIG. 5f, in particular, the block that states "Issue third message -- message complete?".

Should a valid access code then be received, the path leads to block 71 shown in FIG. 5c. However, should no or an invalid access code be received, access is restricted. Specifically, as shown in FIG. 5f, after the third message has been completed (block 91), there is then an eight wait second (block 92). After the eight seconds have elapsed and still a valid access code has not been received, the third message is issued again as shown in block 93 and, thereafter, there is another eight second wait as shown in block 94. If a valid access code still is not received, block 95 is reached.

As with the path shown by steps 66 through 69 in FIG. 5b, the access restriction portion of the circuit can be programmed so that the time period is less than or greater than eight seconds. Further, the access restriction feature can be programmed to eliminate blocks 93 and 94 so that after the third message is issued once and the time period, such as eight seconds, has passed the circuit shall immediately go to block 95 should no valid access code be received.

It will be noted that, in carrying out normal operation, the switch device has handled the incoming communication without outside assistance and without notice to the connected units, i.e. the telephone, the facsimile machine or the auxiliary device. Thus, the party using the telephone 27 is not bothered unless the communication is a voice communication or there has been a failure on the part of the caller to properly send a communication code or the switch device is programmed to default to the telephone without access restriction. This is shown at 80/81/82 of the flow chart of FIG. 5d. If a proper communication code has not been received and the switch device is programmed to "fax" without access restriction, then the cycle of operation will follow the 80/81/83 path on the flow chart of FIG. 5d. Likewise, if a proper communication code has not been received and the switch device is programmed to "aux", without access restriction, the cycle of operation will follow the 80/81/84 path on the flow chart of FIG. 5a. Note that a call maybe also forwarded to a new extension manually by the caller or called party.

It will be noted that use of the telephone, the facsimile machine, or the auxiliary device will be monitored by the switch device to the extent that the used unit (the telephone, the facsimile machine, or the auxiliary device) is permitted use of the telephone line and the unused units are blocked or locked out.

Thus, there has been shown and described a computerized, automated, switch device for use in an internal telephone system. A circuit diagram, in preferred arrangement, with component values has also been shown so that practice of the invention by one skilled in the art is assured.

Although changes and modifications in the operation of the switch device have been discussed, other changes and modifications, as will become apparent to those skilled in the art, may be made without departing from the spirit of the invention as defined in the claims.

Wherefore we claim:

1. A switch device adapted to interface between an incoming telephone line and an internal telephone system which includes a telephone, a facsimile machine and an auxiliary device, said switch device for receiving an incoming communication over the incoming telephone line, including:
   a) connector means for connecting said switch device to the incoming telephone line for receiving the incoming communication;
   b) ring detector means connected to said connector means for detecting a ring signal of the incoming communication;
   c) a central processing unit, connected to and being alerted by said ring detector means, for initiating a program for answering the incoming communication;
   d) a voice synthesis circuit, responsive to said central processing unit, for identifying the internal telephone system to a caller and requesting a code from the caller which identifies the incoming communication;
   e) code detection means for receiving said code and for classifying the incoming communication based on said code, said code detection means includes default means for defaulting to a preselected one of the telephone, the facsimile machine and the auxiliary device should the caller fail to provide a proper code thereby assuring that no incoming communication will be lost;
   f) means for programming the default means to default to the preselected one of the telephone, facsimile machine or the auxiliary device;
   g) means for ringing one of the telephone, the facsimile machine or the auxiliary device of the internal telephone system in accordance with the classification of the incoming communication; and
   h) means for blocking out access to the other two of the internal telephone system.

2. The switch device according to claim 1, further comprising a programmable ROM memory coupled to said central processing unit and programmed for controlling the cyclic operation of said central processing unit.

3. The switch device according to claim 2, wherein said programmable ROM memory includes instructions voiced to the caller requesting that the caller press a first button if the incoming call is a voice call intended to reach said telephone, press a second button if the incoming call is a data call intended to reach said facsimile machine or press a third button if the incoming call is intended to reach said an auxiliary device 4. The switch device according to claim 1, wherein said code detection means is a tone detector which can detect tones from a push-button equipped phone.

5. The switch device according to claim 1, wherein said voice synthesis circuit is a relay driver controlled by said central processing unit and said relay driver includes at least one relay and a plurality of switch contacts each contact having at least a normal position and an actuated position.

6. An internal telephone system having a telephone, a facsimile machine, an auxiliary device and a switch device, said switch device adapted to interface an incoming telephone line with said telephone, said facsimile machine and said auxiliary device for isolating said telephone, said facsimile machine and said auxiliary device from the incoming telephone line, said switch device including:
   a) incoming ring detector means connected between the incoming telephone line and a central processing unit, said incoming ring detector means for receiving ring signals from the incoming telephone line and for sending a signal to said central processing unit indicating an incoming communication on the incoming telephone line;
   b) a programmable memory coupled to said central processing unit and programmed for controlling the operation of said central processing unit;
   c) a voice synthesis circuit for synthesizing a voice message, said voice synthesizer coupled between said central processing unit and the incoming telephone line and operated under control of said central processing unit for identifying said internal telephone system and requesting identification of the incoming communication;
   d) detection means coupled between the incoming telephone line and said central processing unit for receiving an identifying code which identifies the incoming communication and for informing said central processing unit whether the incoming communication is a voice communication or a data communication;
   e) variable position switch means connected to the incoming telephone line, said telephone, said facsimile machine, and said auxiliary device, said variable position switch means operated by said central processing unit for connecting said telephone to the incoming telephone line when the incoming communication is identified as a voice communication, for connecting said facsimile machine to the incoming telephone line when the incoming communication is identified as a data communication, and for connecting said auxiliary device to the incoming telephone line when the incoming communication is identified as an auxiliary communication, said variable position switch means includes default means for connecting an unidentified incoming communication to a preselected one of said telephone, said facsimile machine and said auxiliary device thereby assuring that no incoming communication will be lost; and
   f) means for programming said default means to default to the preselected one of the telephone, facsimile machine or the auxiliary device.

7. The internal telephone system according to claim 6, wherein said switch device further includes a ring generator connecting said central processing unit to said telephone, said facsimile machine and said auxiliary device for ringing said telephone, said facsimile machine or said auxiliary device to announce the incoming communication.

8. The internal telephone system according to claim 7, wherein said switch device further includes switch means operated by said central processing unit for blocking out said telephone and said auxiliary device when said facsimile machine is in use, for blocking out said facsimile machine and said auxiliary device when said telephone is in use, and for blocking out said telephone and said facsimile machine when said auxiliary device is in use.

9. A switch device adapted to interface between an incoming telephone line and an internal telephone system having a telephone, a facsimile machine and an auxiliary device, said switch device for receiving an incoming telephone call to the exclusion of said telephone, said facsimile machine and said auxiliary device, said switch device comprising:

a) a ring detector coupled to the incoming telephone line for receiving a first signal announcing the incoming call on the incoming telephone line and for generating a second signal in response to receiving said first signal;

b) a central processing unit coupled to said ring detector for receiving said second signal, said central processing unit adapted to generate a third signal;

c) a voice synthesis circuit coupled to said central processing unit for synthesizing a voice message upon command of said central processing unit; said voice message including an instruction to a caller making the incoming call;

d) detection means coupled to the incoming telephone line for detecting a response by the caller to said instruction in said voice message and for interpreting said response by the caller and passing such interpretation to said central processing unit, said detection means includes default means for interpreting whether the caller fails to provide a proper response and passing such interpretation to said central processing unit, wherein said central processing unit generates said third signal in response to the interpretation of said detection means;

e) means for programming said default means to default to the preselected one of the telephone, facsimile machine or the auxiliary device;

f) means responsive to said third signal of said central processing unit, for connecting a preselected one of said telephone, said facsimile machine and said auxiliary device of said internal telephone system to the incoming telephone line and for ringing said preselected one of said internal telephone system so connected and for blanking out the other two of said internal telephone system not connected in accordance with said interpretation received by said central processing unit, wherein the third signal in response to the interpretation of said detection means causes the incoming call to be directed to one of said telephone, said facsimile machine and said auxiliary device thereby assuring that no incoming call will be lost.

10. The switch device according to claim 9, further comprising a programmable ROM memory coupled to said central processing unit and programmed for controlling the cyclic operation of said central processing unit.

11. The switch device according to claim 10, wherein said programmable ROM memory includes instructions voiced to the caller requesting that the caller press a first button or dial if the incoming call is a voice call intended to reach said telephone or press a second button if the incoming call is a data call intended to reach said facsimile machine or press a third button if the incoming call is intended to reach said auxiliary device.

12. The switch device according to claim 11, wherein said detection means is a tone detector which can detect tones from a push-button equipped phone.

13. The switch device according to claim 9, wherein said means responsive to said central processing unit is a relay driver controlled by said central processing unit and said relay driver includes at least one relay and a plurality of switch contacts each contact having at least a normal position and an actuated position.

* * * * *